A gallery widget is invoked when a tag in a markup language document, such as a web page, is processed. The gallery widget selects a number of images specified in the tag and places the images in the markup language document as defined by the tag. The images are selected from a gallery containing all images available for display or from a pool of images chosen from the gallery using a gallery administration tool.

(12) United States Patent
Pearson et al.

(10) Patent No.: US 8,335,983 B2
(45) Date of Patent: *Dec. 18, 2012

(54) DYNAMIC SELECTION OF IMAGES FOR WEB PAGES

(75) Inventors: Jennifer Pearson, San Jose, CA (US); Bill Wang, San Jose, CA (US)

(73) Assignee: eBay, Inc., San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/620,450

(22) Filed: Nov. 17, 2009

(65) Prior Publication Data

US 2010/0070841 A1    Mar. 18, 2010

Related U.S. Application Data

(62) Division of application No. 09/589,585, filed on Jun. 7, 2000, now Pat. No. 7,673,229.

(51) Int. Cl.
*G06F 17/00* (2006.01)
*G06F 15/16* (2006.01)
*G06F 17/30* (2006.01)

(52) U.S. Cl. ........ 715/234; 715/201; 715/205; 715/255; 715/273; 709/203; 705/27

(58) Field of Classification Search .................. 715/200, 715/201, 205, 210, 226, 231, 234, 237, 246, 715/255, 273, 760, 762; 709/203, 218; 705/26, 705/27

See application file for complete search history.

(56) References Cited

U.S. PATENT DOCUMENTS

| | | |
|---|---|---|
| 5,325,297 A | 6/1994 | Bird et al. |
| 5,557,728 A | 9/1996 | Garrett et al. |
| 5,745,681 A | 4/1998 | Levine et al. |
| 5,760,917 A | 6/1998 | Sheridan |
| 5,761,655 A | 6/1998 | Hoffman |
| 5,771,380 A | 6/1998 | Tanaka et al. |
| 5,794,210 A | 8/1998 | Goldhaber et al. |
| 5,835,712 A | 11/1998 | DuFresne |
| 5,884,056 A | 3/1999 | Steele |
| 5,890,138 A | 3/1999 | Godin et al. |
| 5,905,973 A | 5/1999 | Yonezawa et al. |

(Continued)

FOREIGN PATENT DOCUMENTS

CA    2253543 A1    3/1997

(Continued)

OTHER PUBLICATIONS

"AOL Picture Tutorial", [Online]. Retrieved from the Internet: <URL: http://web.archive.org/web/19990222102953/www.twaze.com/aolpix>, 19 pgs.

(Continued)

*Primary Examiner* — Maikhanh Nguyen
(74) *Attorney, Agent, or Firm* — Schwegman Lundberg & Woessner, P.A.

(57) ABSTRACT

A gallery widget is invoked when a tag in a markup language document, such as a web page, is processed. The gallery widget selects a number of images specified in the tag and places the images in the markup language document as defined by the tag. The images are selected from a gallery containing all images available for display or from a pool of images chosen from the gallery using a gallery administration tool.

16 Claims, 6 Drawing Sheets

U.S. PATENT DOCUMENTS

| | | | |
|---|---|---|---|
| 5,905,974 | A | 5/1999 | Fraser et al. |
| 5,905,975 | A | 5/1999 | Ausubel |
| 5,915,038 | A | 6/1999 | Abdel-Mottaleb et al. |
| 5,918,236 | A | 6/1999 | Wical |
| 5,926,794 | A | 7/1999 | Fethe |
| 5,956,709 | A | 9/1999 | Xue et al. |
| 6,029,141 | A * | 2/2000 | Bezos et al. .......... 705/27.1 |
| 6,045,447 | A | 4/2000 | Yoshizawa et al. |
| 6,049,785 | A | 4/2000 | Gifford |
| 6,055,518 | A | 4/2000 | Franklin et al. |
| 6,057,842 | A | 5/2000 | Knowlton et al. |
| 6,058,379 | A | 5/2000 | Odom et al. |
| 6,058,399 | A | 5/2000 | Morag |
| 6,058,417 | A | 5/2000 | Hess et al. |
| 6,058,428 | A | 5/2000 | Wang et al. |
| 6,061,057 | A | 5/2000 | Knowlton et al. |
| 6,085,176 | A | 7/2000 | Woolston |
| 6,085,229 | A * | 7/2000 | Newman et al. .......... 709/203 |
| 6,119,135 | A | 9/2000 | Helfman |
| 6,141,006 | A | 10/2000 | Knowlton et al. |
| 6,154,755 | A | 11/2000 | Dellert et al. |
| 6,167,382 | A | 12/2000 | Sparks et al. |
| 6,178,408 | B1 | 1/2001 | Copple et al. |
| 6,185,558 | B1 * | 2/2001 | Bowman et al. .......... 705/37 |
| 6,202,051 | B1 | 3/2001 | Woolston |
| 6,237,010 | B1 | 5/2001 | Hui et al. |
| 6,243,691 | B1 | 6/2001 | Fisher et al. |
| 6,252,612 | B1 | 6/2001 | Jeddeloh |
| 6,269,238 | B1 | 7/2001 | Iggulden |
| 6,272,472 | B1 | 8/2001 | Danneels et al. |
| 6,275,829 | B1 | 8/2001 | Angiulo et al. |
| 6,317,722 | B1 | 11/2001 | Jacobi et al. |
| 6,356,283 | B1 | 3/2002 | Guedalia |
| 6,366,899 | B1 | 4/2002 | Kernz |
| 6,415,320 | B1 | 7/2002 | Hess et al. |
| 6,504,571 | B1 | 1/2003 | Narayanaswami et al. |
| 6,507,841 | B2 | 1/2003 | Riverieulx de Varax |
| 6,510,462 | B2 | 1/2003 | Blumenau |
| 6,591,248 | B1 | 7/2003 | Nakamura et al. |
| 6,654,725 | B1 | 11/2003 | Langheinrich et al. |
| 6,693,652 | B1 | 2/2004 | Barrus et al. |
| 6,704,797 | B1 | 3/2004 | Fields et al. |
| 6,732,161 | B1 | 5/2004 | Hess et al. |
| 6,785,671 | B1 | 8/2004 | Bailey et al. |
| 6,850,899 | B1 | 2/2005 | Chow et al. |
| 6,925,444 | B1 | 8/2005 | McCollom et al. |
| 7,007,076 | B1 | 2/2006 | Hess et al. |
| 7,162,446 | B1 | 1/2007 | Handler |
| 7,197,475 | B1 | 3/2007 | Lorenzen et al. |
| 7,216,092 | B1 | 5/2007 | Weber et al. |
| 7,418,483 | B2 | 8/2008 | Hess et al. |
| 7,499,979 | B2 | 3/2009 | Hess et al. |
| 7,512,548 | B1 * | 3/2009 | Bezos et al. .......... 705/26.1 |
| 7,673,229 | B1 | 3/2010 | Pearson et al. |
| 7,827,075 | B2 | 11/2010 | Hess et al. |
| 7,912,925 | B2 | 3/2011 | Hess et al. |
| 2001/0014184 | A1 * | 8/2001 | Bubie et al. .......... 382/293 |
| 2002/0054049 | A1 | 5/2002 | Toyoda et al. |
| 2003/0208560 | A1 | 11/2003 | Inoue et al. |
| 2006/0101131 | A1 | 5/2006 | Hess et al. |
| 2006/0206795 | A1 | 9/2006 | Hess et al. |
| 2009/0113347 | A1 | 4/2009 | Hess et al. |
| 2009/0192919 | A1 | 7/2009 | Hess et al. |
| 2011/0229050 | A1 | 9/2011 | Hess et al. |

FOREIGN PATENT DOCUMENTS

| | | |
|---|---|---|
| CA | 2180995 A1 | 1/1998 |
| EP | 1131724 A1 | 9/2001 |
| FR | 2658635 | 8/1991 |
| JP | 08335265 | 12/1996 |
| JP | 10232658 | 9/1998 |
| JP | 11114218 | 4/1999 |
| JP | 2000025218 | 1/2000 |
| JP | 2001239018 A | 9/2001 |
| JP | 4936628 B | 3/2012 |
| NL | 9300266 | 2/1993 |
| WO | WO-9215174 A1 | 9/1992 |
| WO | WO-9422108 A1 | 9/1994 |
| WO | WO-9517711 A1 | 6/1995 |
| WO | WO-9522800 A1 | 8/1995 |
| WO | WO-9634356 A1 | 10/1996 |
| WO | WO-9737315 A1 | 10/1997 |
| WO | WO-9746957 A1 | 12/1997 |
| WO | WO-9835468 A2 | 8/1998 |
| WO | WO-9918510 A1 | 8/1999 |
| WO | WO-9953422 A1 | 10/1999 |
| WO | WO-9959283 A2 | 11/1999 |
| WO | WO-9963461 A1 | 12/1999 |
| WO | WO-0025218 A1 | 5/2000 |
| WO | WO-0025223 A1 | 5/2000 |
| WO | WO-0032088 A1 | 11/2000 |
| WO | WO-0078557 A1 | 12/2000 |
| WO | WO-0141013 A1 | 6/2001 |
| WO | WO-0182107 A1 | 11/2001 |
| WO | WO-0195297 A1 | 12/2001 |

OTHER PUBLICATIONS

"U.S. Appl. No. 09/177,726, Non Final Office Action mailed Feb. 7, 2000", 4 pgs.

"U.S. Appl. No. 09/177,726, Non Final Office Action mailed Feb. 9, 2000", 2 pgs.

"U.S. Appl. No. 09/177,726, Non Final Office Action mailed Jul. 21, 1999", 6 pgs.

"U.S. Appl. No. 09/177,726, Notice of Allowance mailed Feb. 9, 2000", 3 pgs.

"U.S. Appl. No. 09/177,726, Notice of Allowance mailed Aug. 16, 1999", 2 pgs.

"U.S. Appl. No. 09/177,726, Response filed Aug. 31, 1999 to Non Final Office Action mailed Jul. 21, 1999", 3 pgs.

"U.S. Appl. No. 09/177,726, Response to Rule 312 Communication mailed Feb. 7, 2000", 4 pgs.

"U.S. Appl. No. 09/436,566, Final Office Action mailed Mar. 18, 2003", 6 pgs.

"U.S. Appl. No. 09/436,566, Non Final Office Action mailed Oct. 8, 2002", 8 pgs.

"U.S. Appl. No. 09/436,566, Notice of Allowance mailed Nov. 18, 2003", 8 pgs.

"U.S. Appl. No. 09/436,566, Preliminary Amendment filed Mar. 1, 2000", 13 pgs.

"U.S. Appl. No. 09/436,566, Response filed Feb. 10, 2003 to Non Final Office Action mailed Oct. 8, 2002", 14 pgs.

"U.S. Appl. No. 09/436,566, Supplemental Preliminary Amendment filed Mar. 8, 2002", 17 pgs.

"U.S. Appl. No. 09/542,464, Non Final Office Action mailed Jan. 23, 2001", 4 pgs.

"U.S. Appl. No. 09/542,464, Notice of Allowance mailed Apr. 6, 2001", 3 pgs.

"U.S. Appl. No. 09/542,464, Notice of Allowance mailed Nov. 5, 2001", 3 pgs.

"U.S. Appl. No. 09/542,464, Preliminary Amendment filed Apr. 4, 2000", 6 pgs.

"U.S. Appl. No. 09/542,464, Preliminary Amendment filed Oct. 23, 1998", 6 pgs.

"U.S. Appl. No. 09/589,585, Advisory Action mailed Mar. 26, 2009", 3 pgs.

"U.S. Appl. No. 09/589,585, Advisory Action mailed Apr. 4, 2007", 5 pgs.

"U.S. Appl. No. 09/589,585, Appeal Brief filed May 22, 2007", 25 pgs.

"U.S. Appl. No. 09/589,585, Appeal Brief filed Jul. 6, 2009", 26 pgs.

"U.S. Appl. No. 09/589,585, Final Office Action mailed Jan. 6, 2009", 16 pgs.

"U.S. Appl. No. 09/589,585, Final Office Action mailed Nov. 16, 2006", 18 pgs.

"U.S. Appl. No. 09/589,585, Non-Final Office Action mailed Jan. 11, 2008", 16 pgs.

"U.S. Appl. No. 09/589,585, Non-Final Office Action mailed Jan. 12, 2005", 10 pgs.

"U.S. Appl. No. 09/589,585, Non-Final Office Action mailed Mar. 26, 2004", 9 pgs.

"U.S. Appl. No. 09/589,585, Non-Final Office Action mailed May 18, 2006", 16 pgs.
"U.S. Appl. No. 09/589,585, Non-Final Office Action mailed Aug. 23, 2005", 10 pgs.
"U.S. Appl. No. 09/589,585, Notice of Allowance mailed Oct. 13, 2009", 12 pgs.
"U.S. Appl. No. 09/589,585, Response filed Feb. 23, 2006 to Non-Final Office Action mailed Aug. 23, 2005", 13 pgs.
"U.S. Appl. No. 09/589,585, Response filed Mar. 6, 2009 to Final Office Action mailed Jan. 6, 2009", 11 pgs.
"U.S. Appl. No. 09/589,585, Response filed Mar. 7, 2007 to Final Office Action mailed Nov. 16, 2006", 13 pgs.
"U.S. Appl. No. 09/589,585, Response filed Apr. 11, 2008 to Non-Final Office Action mailed Jan. 11, 2008", 8 pgs.
"U.S. Appl. No. 09/589,585, Response filed Jun. 13, 2005 to Non-Final Office Action mailed Jan. 12, 2005", 17 pgs.
"U.S. Appl. No. 09/589,585, Response filed Jul. 16, 2004 to Non-Final Office Action mailed Mar. 26, 2004", 9 pgs.
"U.S. Appl. No. 09/589,585, Response filed Aug. 10, 2006 to Non-Final Office Action mailed May 18, 2006", 6 pgs.
"U.S. Appl. No. 09/589,585, Response filed Dec. 23, 2003 to Restriction Requirement mailed Nov. 25, 2003", 7 pgs.
"U.S. Appl. No. 09/589,585, Restriction Requirement mailed Nov. 25, 2003", 5 pgs.
"U.S. Appl. No. 09/777,306, Advisory Action mailed Aug. 23, 2004", 3 pgs.
"U.S. Appl. No. 09/777,306, Final Office Action mailed Jun. 4, 2004", 9 pgs.
"U.S. Appl. No. 09/777,306, Non Final Office Action mailed Jan. 14, 2004", 8 pgs.
"U.S. Appl. No. 09/777,306, Non Final Office Action mailed Oct. 21, 2004", 6 pgs.
"U.S. Appl. No. 09/777,306, Notice of Allowance mailed Jun. 1, 2005", 4 pgs.
"U.S. Appl. No. 09/777,306, Notice of Allowance mailed Sep. 9, 2005", 4 pgs.
"U.S. Appl. No. 09/777,306, Preliminary Amendment filed Sep. 24, 2004", 15 pgs.
"U.S. Appl. No. 09/777,306, Response filed Feb. 22, 2005 to Non Final Office Action mailed Oct. 21, 2004", 7 pgs.
"U.S. Appl. No. 09/777,306, Response filed Apr. 13, 2004 to Non Final Office Action mailed Jan. 14, 2004", 15 pgs.
"U.S. Appl. No. 09/777,306, Response filed Jul. 30, 2004 to Non-Final Office Action mailed Jun. 4, 2004", 14 pgs.
"U.S. Appl. No. 09/777,306, Second Supplemental Preliminary Amendment filed Jan. 4, 2002", 16 pgs.
"U.S. Appl. No. 09/777,306, Supplemental Preliminary Amendment filed Dec. 4, 2001", 15 pgs.
"U.S. Appl. No. 09/777,306, Third Preliminary Amendment filed Mar. 11, 2002", 17 pgs.
"U.S. Appl. No. 11/312,876, Non Final Office Action mailed Apr. 9, 2007", 5 pgs.
"U.S. Appl. No. 11/312,876, Final Office Action mailed Aug. 22, 2008", 6 pgs.
"U.S. Appl. No. 11/312,876, Final Office Action mailed Oct. 9, 2007", 5 pgs.
"U.S. Appl. No. 11/312,876, Non-Final Office Action mailed Apr. 28, 2008", 5 pgs.
"U.S. Appl. No. 11/312,876, Notice of Allowance mailed Oct. 24, 2008", 8 pgs.
"U.S. Appl. No. 11/312,876, Preliminary Amendment filed Dec. 20, 2005", 7 pgs.
"U.S. Appl. No. 11/312,876, Response filed Mar. 10, 2008 to Final Office Action mailed Oct. 9, 2007", 9 pgs.
"U.S. Appl. No. 11/312,876, Response filed Jun. 9, 2008 to Non-Final Office Action mailed Apr. 28, 2008", 11 pgs.
"U.S. Appl. No. 11/312,876, Response filed Aug. 9, 2007 to Non Final Office Action mailed Apr. 9, 2007", 10 pgs.
"U.S. Appl. No. 11/312,876, Response filed Oct. 7, 2008 to Final Office Action mailed Aug. 22, 2008", 7 pgs.
"U.S. Appl. No. 11/421,114, Final Office Action mailed Aug. 30, 2007", 6 pgs.
"U.S. Appl. No. 11/421,114, Non Final Office Action mailed Apr. 18, 2007", 7 pgs.
"U.S. Appl. No. 11/421,114, Non-Final Office Action mailed Dec. 20, 2007", 7 pgs.
"U.S. Appl. No. 11/421,114, Notice of Allowance mailed Apr. 23, 2008", 6 pgs.
"U.S. Appl. No. 11/421,114, Response filed Mar. 10, 2008 to Non-Final Office Action mailed Dec. 20, 2007", 15 pgs.
"U.S. Appl. No. 11/421,114, Response filed Jul. 16, 2007 to Non Final Office Action mailed Apr. 18, 2007", 21 pgs.
"U.S. Appl. No. 11/421,114, Response filed Oct. 31, 2007 to Final Office Action mailed Aug. 30, 2007", 20 pgs.
"U.S. Appl. No. 12/416,076 Notice of Allowance mailed Jul. 7, 2010", 7 pgs.
"U.S. Appl. No. 12/416,076, Non-Final Office Action mailed May 12, 2010", 11 pgs.
"U.S. Appl. No. 12/416,076, Response filed Jun. 22, 2010 to Non Final Office Action mailed May 12, 2010", 11 pgs.
"Application Serial No. 01941962.1, EPO Written Decision to Refuse mailed Mar. 30, 2010", 17 pgs.
"Australian Application Serial No. 2001275270, First Examiner's Report mailed Oct. 21, 2005", 3 pgs.
"Australian Application Serial No. 2001275270, Second Examiner's Report mailed Nov. 21, 2006", 2 pgs.
"Australian Application Serial No. 2001275270, Third Examiner's Report mailed May 11, 2007", 2 pgs.
"Australian Application Serial No. 2007234637, First Examiner Report mailed May 13, 2009", 5 pgs.
"Creating an Executable Image using Program "Build Job"", [Online]. Retrieved from the Internet: <URL: http://www-cdf.fnal.gov/offline/a_c/cdf384/node7.html>, (Accessed Aug. 18, 2007), 1 pg.
"European Application Serial No. 01941962.1, Supplementary European Search Report Mar. 9, 2007", 8 pgs.
"European Application Serial No. 01941962.1, Office Action mailed Jul. 17, 2008", 8 pgs.
"European Application Serial No. 01941962.1, European Search Report mailed Aug. 24, 2006", 6 pgs.
"Frontier Scripting: What's Here?", [Online]. Retrieved from the Internet: <URL: http://www.spinwardstars.com/frontier/>, (1999), 2 pgs.
"Japanese Application Serial No. 02-502756, Final Office Action mailed Jun. 10, 2010", 3 Pgs.
"Java", *impress corporation*. Home Page vol. 3,, 145-152 pgs.
"Javascript Handout 2", *Hypermedia Production*, (1998), 3 pgs.
"Korean Application Serial No. 2002-7016733, Grounds for Rejection mailed Apr. 18, 2007", 7 pgs.
"Korean Application Serial No. 2002-7016733, Trial Decision mailed May 13, 2008", 16 pgs.
"Posting images on Auction Web", [Online]. Retrieved from the Internet: <URL: http://web.archive.org/web/19980503163306/pongo.com/tutorials/aweb-images/>, 2 Pages.
"Web", *ASCII Network Technology*, 228-231 pgs.
"Whatever your treasure online picture sell it better", PixHost.com, [Online]. Retrieved from the Internet: <URL: http://web.archive.org/web/19981202192135/http:www.pixhost.com/>, 17 Pages.
Gimenez-Funes, E., et al., "Designing Bidding Strategies for Trading Agents in Electronic Auctions", *Artificial Intelligence Research Institute, IIIA*, (Jul. 1998), 136-143.
Kernz, James J., "Apparatus and Method for Certified Coin Image Compilation", U.S. Appl. No. 60/076,380, filed Feb. 26, 1998, 18 pgs.
Klein, Stefan, "Introduction to Electronic Auctions", *EM—Electronic Auctions. EM—Electronic Markets*, vol. 7, No. 4, (Dec. 1997), 3-6.
Liepins, P J, "A browser based image bank, useful tool or expensive toy?", *Med Inform*, 23(3), (Jul.-Sep. 1998), 199-206.
Maller, J., "Random Images with Javascript", *Javascript Image Replacement* (online), http://www.joemaller.com/business/webtcools/javascript/random_image.html, (May 1, 1997), 1-4.
Manabu, Nagai, "Challenger, Rakuten Market, "easy EC" from fifty thousand Yen par a month, one hundred stores are stood side by side", *Nikkei Multimedia, Nikkei BP*, No. 32, (Feb. 15, 1998), 78-83 pgs.

Padmanabhan, V. N, et al., "Using Predictive Prefetching to improved world wide web latency", *ACM SIGCOMM Computer Communication Review*, 26(3), (1996), 22-36.

Reynolds, S., "htmlGallery Suite", *Frontier Scripting (online)*, http://www.spinwardstars.com/frontier/f4/gallery.html, (Feb. 16, 1999), 1-5.

Reynolds, S., "htmlImage Suite (F4)", *Frontier Scripting (Online)*, http://www.spinwardstars.com/frontier/f4/htmlimage.html, (May 23, 1999), 1-23.

Reynolds, S., "Randomizer Suite: About Randomizer", *Frontier Scripting (Online)*, http://www.spinwardstars/frontier/suiters/randonizer.html, (Aug. 3, 1999), 1-4.

"U.S. Appl. No. 12/347,929, Non-Final Office Action mailed Sep. 20, 2010", 5 pgs.

"U.S. Appl. No. 12/347,929, Response filed Oct. 22, 2010 Final Office Action mailed Sep. 20, 2010", 12 pgs.

"European Application Serial No. 01941962.1, Response filed Nov. 27, 2008 to Office Action mailed Jul. 17, 2008", 3 pgs.

"International Application Serial No. PCT/US01/18225, International Preliminary Examination Report mailed Nov. 18, 2000", 5 pgs.

"Japanese Application Serial No. 2002-502756, Amendment filed Dec. 7, 2007", 6 pgs.

"Japanese Application Serial No. 2002-502756, Final Office Action mailed Aug. 4, 2011", 16 pgs.

"Korean Application Serial No. 2002-7016733, Final Office Action mailed Nov. 28, 2007", 4 pgs.

"Korean Application Serial No. 2002-7016733, Response filed Jan. 28, 2008 to Final Office Action mailed Nov. 28, 2007", 22 pgs.

"Korean Application Serial No. 2002-7016733, Response filed Jul. 18, 2007 to Office Action mailed Apr. 18, 2007", 30 pgs.

"U.S. Appl. No. 12/347,929, Notice of Allowance mailed Nov. 10, 2010", 5 pgs.

"Australian Application Serial No. 2001275270, Response filed Apr. 20, 2007 to Office Action mailed Nov. 21, 2006", 15 pgs.

"Australian Application Serial No. 2001275270, Response filed Jul. 5, 2007 to Office Action mailed May 11, 2007", 4 pgs.

"Australian Application Serial No. 2001275270, Response filed Nov. 2, 2006 to Office Action mailed Oct. 21, 2005", 24 pgs.

"International Application Serial No. PCT/US99/18510, International Search Report mailed Oct. 29, 1999", 1 pgs.

"Japanese Application Serial No. 2002-502756, Office Action mailed Mar. 15, 2011", 7 pgs.

"U.S. Appl. No. 09/436,566, Response filed May 16, 2003 to Final Office Action mailed Mar. 18, 2003", 5 pgs.

"U.S. Appl. No. 09/589,585, Amended Appeal Brief filed Oct. 5, 2007", 28 pgs.

"U.S. Appl. No. 09/589,585, Examiner Interview Summary mailed Apr. 1, 2008", 2 pgs.

"U.S. Appl. No. 09/589,585, Supplemental Notice of Allowability mailed Nov. 20, 2009", 11 pgs.

"U.S. Appl. No. 09/777,306, Preliminary Amendment filed Feb. 5, 2001", 8 pgs.

"U.S. Appl. No. 09/777,306, Preliminary Amendment filed Dec. 4, 2001", 14 pgs.

"U.S. Appl. No. 09/777,306, Second Supplemental Preliminary Amendment filed Jan. 4, 2002", 15 pgs.

"U.S. Appl. No. 09/777,306, Third Preliminary Amendment filed Mar. 11, 2002", 16 pgs.

"U.S. Appl. No. 12/416,076, Examiner Interview Summary mailed Jun. 25, 2010", 3 pgs.

"U.S. Appl. No. 13/053,453, Non-Final Office Action Mailed Mar. 1, 2012", 5 pgs.

"U.S. Appl. No. 13/053,453, Notice of Allowance mailed Apr. 27, 2012", 5 pgs.

"U.S. Appl. No. 13/053,453, Preliminary Amendment filed Apr. 11, 2011", 17 pgs.

"U.S. Appl. No. 13/053,453, Response filed Apr. 18, 2012 to Non Final Office Action mailed Mar. 1, 2012", 9 pgs.

"U.S. Appl. No. 13/053,453, Response filed Dec. 19, 2011 to Restriction Requirement mailed Oct. 27, 2011", 8 pgs.

"U.S. Appl. No. 13/053,453, Restriction Requirement mailed Oct. 27, 2011", 4 pgs.

"Japanese Application Serial No. 2002-502756, Response filed Dec. 5, 2011 to Final Office Action mailed Aug. 4, 2011", 28 pgs.

* cited by examiner

DYNAMIC SELECTION OF IMAGES FOR WEB PAGES

CROSS-REFERENCE TO RELATED APPLICATIONS

This application is a divisional application of U.S. application Ser. No. 09/589,585, filed on Jun. 7, 2000 now U.S. Pat No 7,673,229, entitled "Dynamic Selection of Images for Web Pages," which is incorporated herein by reference in its entirety.

FIELD OF THE INVENTION

This invention relates generally to content displayed as pages on the World Wide Web, and more particularly to selecting images as part of such content.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, eBay Inc., All Rights Reserved.

BACKGROUND OF THE INVENTION

Images are frequently used on World Wide Web (web) pages as illustration and to make the pages more attractive. Both purposes are particularly important when the Web site displaying the pages is a business. A user is more likely to explore a web site that shows images of the items for sale. In a Web-based business, such as an auction site, in which the inventory turns over rapidly, regenerating one or more web pages to display new images is especially important. However, choosing the new images to display is currently a manual process and thus cannot be accomplished as rapidly as may be desirable. Furthermore, once the images are selected, they must be integrated with the other content on the web page. Therefore, it would be advantageous to provide for the dynamic selection of images for web pages and for the automatic integration of the selected images to permit frequent and rapid modifications of the web pages.

SUMMARY OF THE INVENTION

The above-mentioned shortcomings, disadvantages and problems are addressed by the present invention, which will be understood by reading and studying the following specification.

A gallery widget provides for the automatic selection and integration of images in a markup language document, such as a web page. A widget tag is encoded on the web page that invokes the gallery widget when the page is being processed for display. The gallery widget is a utility program that selects a pre-determined number of images from a group of images and places the images on the web page. The number of images and their location on the web page are specified in the widget tag. The gallery widget can select the images from a gallery that contains all available images or from a pool of images created from the gallery using a gallery administration tool.

Because the gallery widget is automatically invoked when the page is being readied for display, there is no manual intervention required so web pages encoded with the widget tag can be regenerated as frequently as necessary to maintain current images on the pages. When it is desirable to choose certain types of images during a time period, such as for promotional purposes, the gallery administration tool allows a user to create a pool of images having common characteristics in advance.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

An overview of a network-based transaction facility in which embodiments of the invention may be practiced is first described to provide a context for the invention. Next the operations and methods of the invention are described in conjunction with block diagrams and flowcharts. An exemplary computer hardware and software environment suitable for use with the invention are then described. Finally a conclusion of the detailed description is presented.

Transaction Facility

Figure 1:
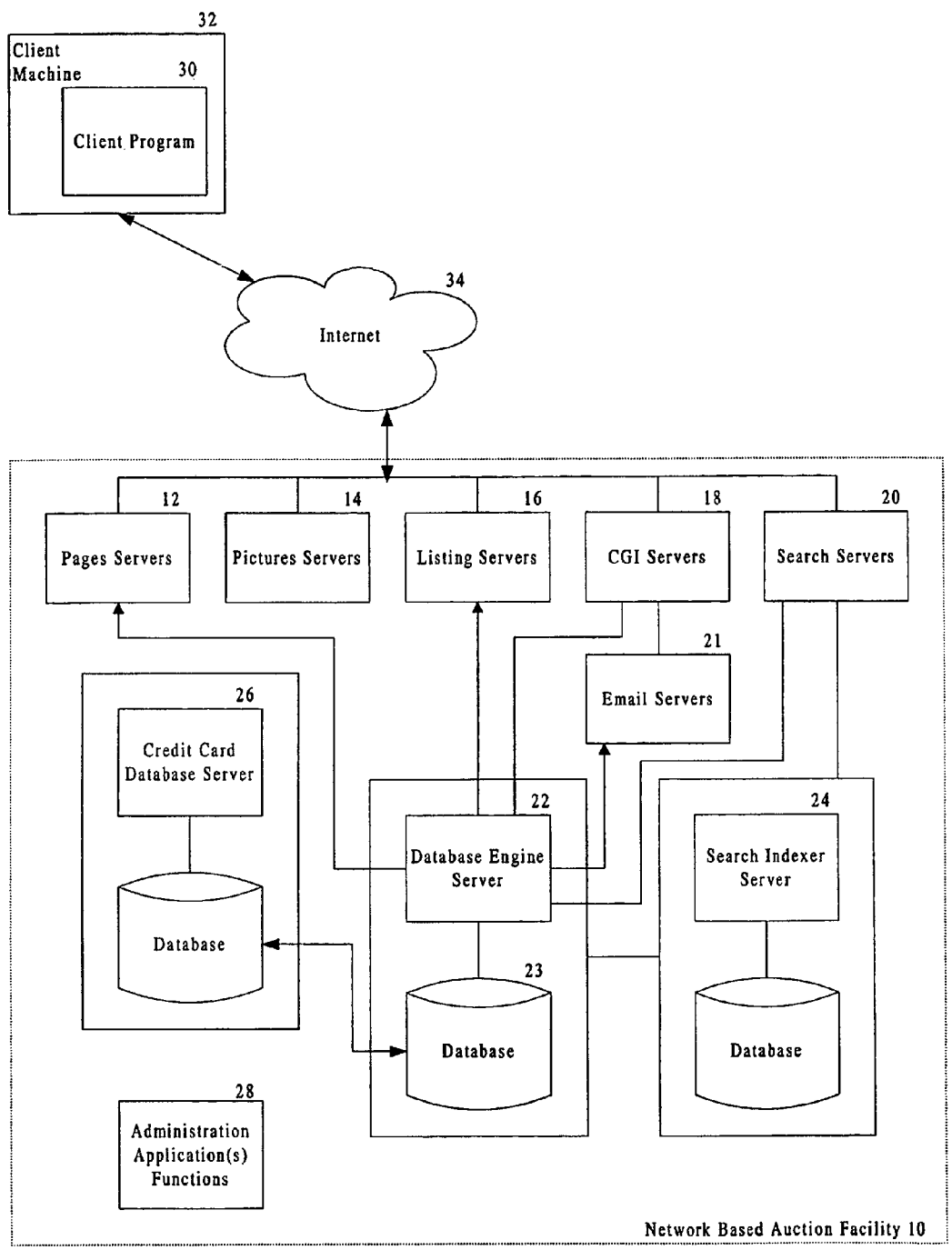
FIG. 1 is a diagram of one embodiment of a transaction facility suitable for practicing the present invention.

The following description of FIG. 1 is intended to provide an overview of a network-based transaction facility (e.g., business-to-business, business-to-consumer and consumer-to-consumer Internet marketplaces and retailers) but is not intended to limit the applicable computer environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. For the purposes of the present specification, the term "transaction" shall be taken to include any communications between two or more entities and shall be construed to include, but not be limited to, commercial transactions including sale and purchase transactions, auctions and the like. While exemplary embodiments of the present invention is described within the context of an Internet auction facility 10 as shown in FIG. 1, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within web pages, listing servers 16, CGI servers 18 that provide an intelligent interface to the back-end of facility 10, and search servers 20 that handle search requests to the facility 10. E-mail servers 21 provide automated e-mail communications to users of the facility 10 and other services as known in the art.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

The client and server machines are described in conjunction with FIG. 5 below.

Operational Overview

A system level overview of the operation of two embodiments of the invention are described by reference to FIGS. 2A and 2B. Images available for display on web pages are stored in a data structure 201, also referred to as a Gallery™ (Gallery is a trademark of eBay Inc., of San Jose, Calif., assignee of the present invention). A web page 205 is encoded with an instruction or "widget tag" that invokes a utility program 203, referred to as a "gallery widget", when the web page 205 is being prepared for display.

Figure 2A:
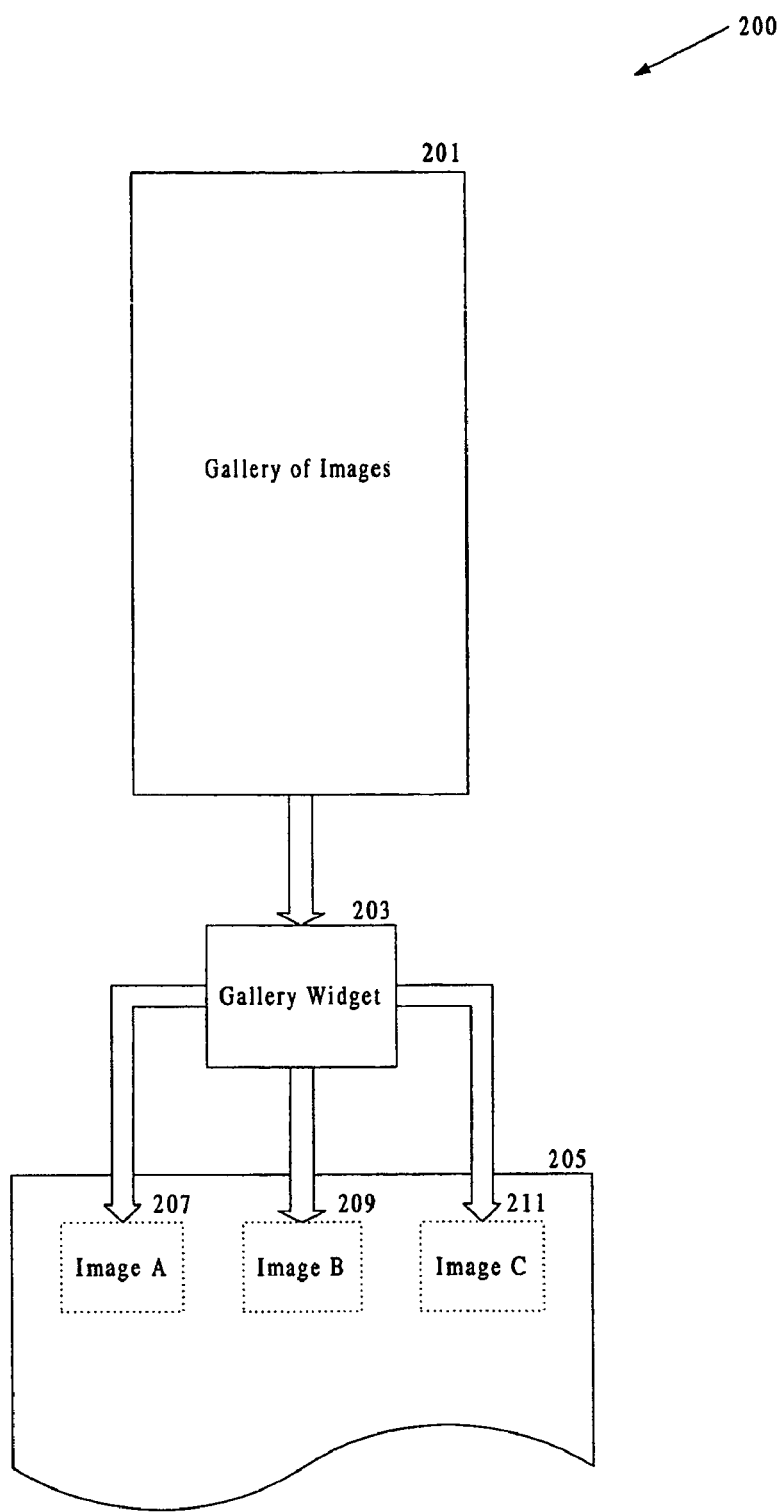
FIGS. 2A-B are block diagrams illustrating two embodiments of the invention.

In the embodiment illustrated in FIG. 2A, when the gallery widget 203 is invoked, it randomly selects a number of images specified in the widget tag from the Gallery 201 and places them on the web page 205 at locations 207, 209, 211 as defined in the widget tag.

When used in conjunction with the auction facility 10 shown FIG. 1, the gallery 201 is a set of thumbnail image records stored in a data base, such as data base 23. Each thumbnail image record contains data associated with an auction item represented by the image, such as an identifier for the item, a category for the item, a date and time for the end of the auction for the item, and an address for the image itself. The widget tag is encoded on the web page 205 in a proprietary format that identifies the gallery widget, specifies the number of images required, and defines the display parameters for the images. Additional parameters, such as a category identifier for the images, can also be included. At periodic intervals, the web page 205 is regenerated by compiling the page source code into standard HTML code suitable for display by a browser, such as Internet Explorer. When the compiler processes the widget tag, it invokes the gallery widget 203 to select the images for the page 205. Thus, for example, when a web home page contains a widget tag of the format, <Home Page Gallery, categoryID=M, numitems=N, picwidth=X, picheight=Y, picspace=Z, numrows=R, numcols=C>, the text "Home Page Gallery" identifies which gallery widget should be invoked when the home page is compiled, M identifies a particular category of images to be displayed on the home page, N specifies the number of images, and the combination of X, Y, Z, R and C defines the coordinates on the home page for the image locations.

Figure 2B:
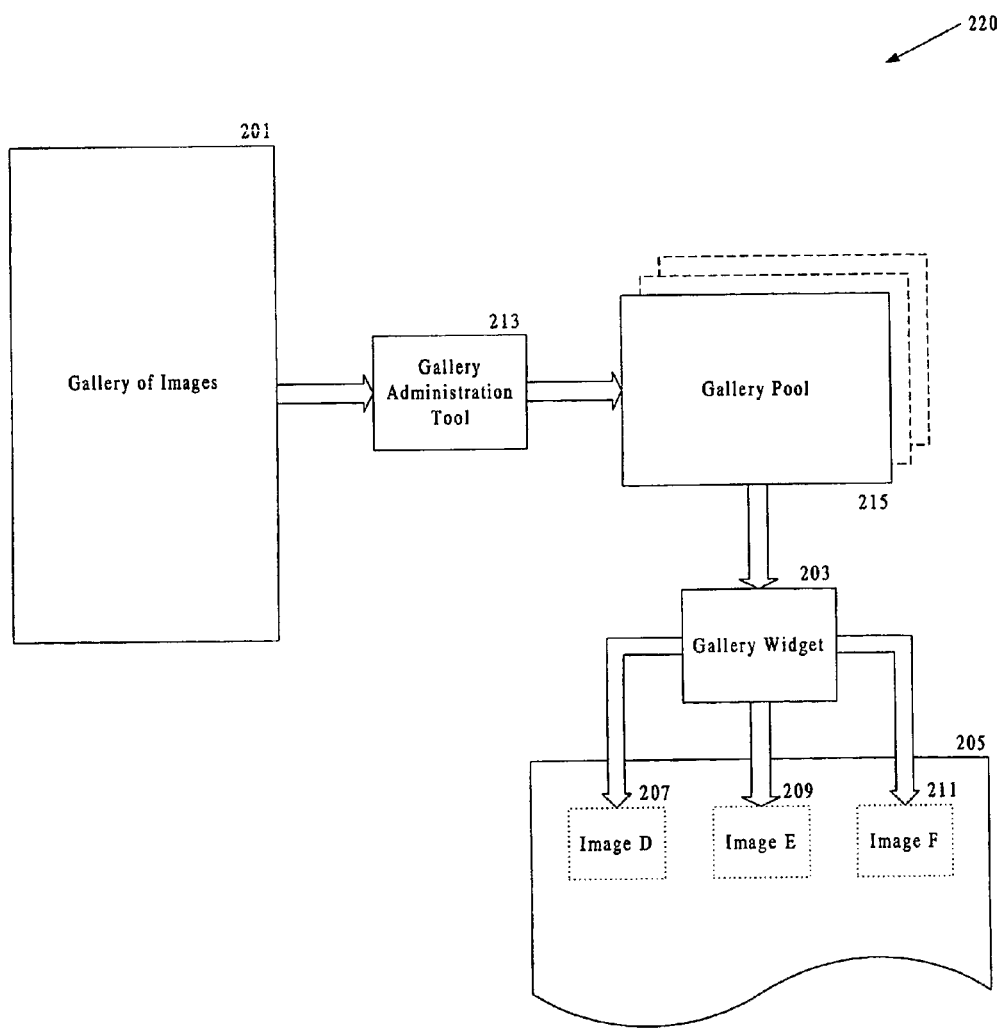

In an alternate embodiment illustrated in FIG. 2B, a gallery administration tool 213 pre-selects a certain number of images from the Gallery 201 to form a gallery pool data structure 215. The gallery administration tool 213 compares the images in the gallery 201 with various filtering criteria and allocates those images that meet the filtering criteria to the gallery pool 215. When the web page 205 is being prepared for display, the gallery widget 203 selects the required number of images from the gallery pool 215 rather than from the full Gallery 201. The gallery pool 215 may be used to hold images having common criteria, such as an expiration date or category. More than one image pool 215 can be created, as shown in phantom in FIG. 2B.

When used in conjunction with the auction facility 10 of FIG. 1, the gallery administration tool 211 is periodically executed by a user to choose the images for the pool 203 that will be available for display during the next time period based on filtering criteria input by the user. The criteria may be predicated on the occurrence of a special promotion or a particular theme such as a holiday. So, for example, a marketing employee could choose a large number of appropriate holiday images to fill the pool but would not have to know exactly how many images may be used. The user is also given the option of deleting individual items from the image pool 203 and for purging all images associated with items no longer at auction. Information from the Gallery thumbnail image records that match the filtering criteria are used to create the set of gallery pool records.

The system level overview of the operation of an embodiment of the invention has been described in this section of the detailed description. A gallery widget has been described that automatically selects and places images on a web page when a widget tag encoded on the web page invokes the widget. The gallery widget can select the images from a Gallery data structure containing all available images or from one or more gallery image pool data structures created by a gallery administration tool using pre-determined filtering criteria. While the invention is not limited to any particular widget tag, for sake of clarity a specific tag format has been described. It will be appreciated that the description of the invention in terms of a web page encompasses all documents written in any markup language.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media) If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figures 3A, 3B:
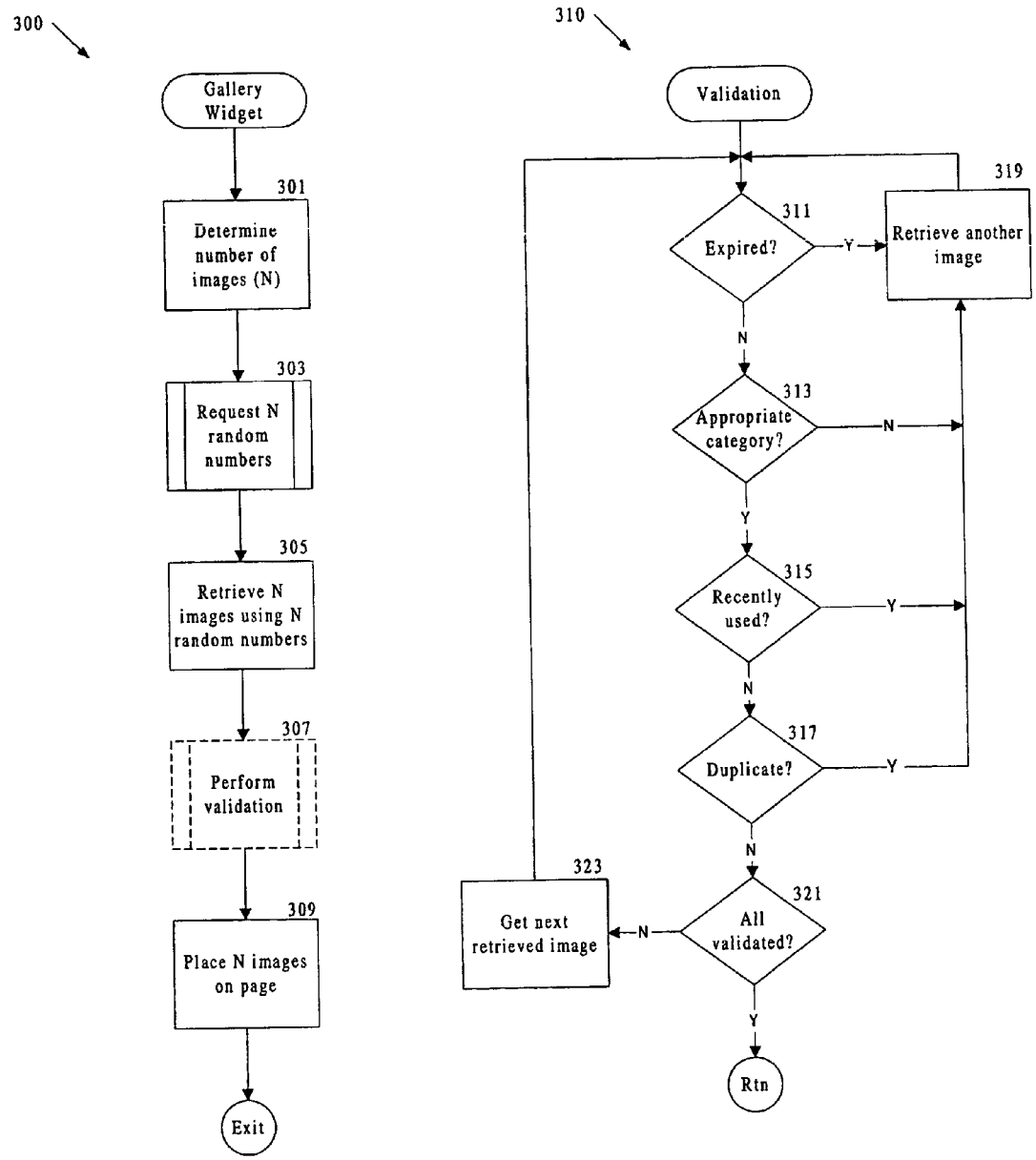
FIGS. 3a-B are flowcharts of a gallery widget method to be performed by a computer according to an embodiment of the invention.

Referring first to FIG. 3A, the acts to be performed by a computer executing a gallery widget method 300 are shown. When the gallery widget is invoked during the preparation of a web page, the method 300 determines the number of images (N) specified in the gallery widget tag (block 301) and calls a random number generator, such as one commonly provided by computer operating system, requesting N random numbers (block 303). The method 300 retrieves N images using each random number as an index into either the Gallery or the gallery pool data structure (block 305). The determination to use the Gallery or one of the gallery pools may be coded in the widget or may be driven by an additional parameter in the widget tag. The retrieved images are then placed on the page at the locations specified in the gallery widget tag (block 309).

In an alternate embodiment also illustrated in FIG. 3A, the method 300 can perform an optional validation method on the images retrieved (block 307, shown in phantom). An embodiment of such a validation method 310 illustrated in FIG. 3B validates each of the images against four criteria. If the image has expired (block 311), is not an appropriate category (block 313), has been recently used (block 315), or is a duplicate of an already selected image (block 317), then another image is retrieved from either the Gallery or gallery pool to replace it (block 319). Once all images have been evaluated (blocks 321, 323), the validation method 310 returns to the gallery widget method 300. It will be appreciated that fewer or more than four criteria can be incorporated into a validation method without exceeding the scope of the invention.

Figure 4:
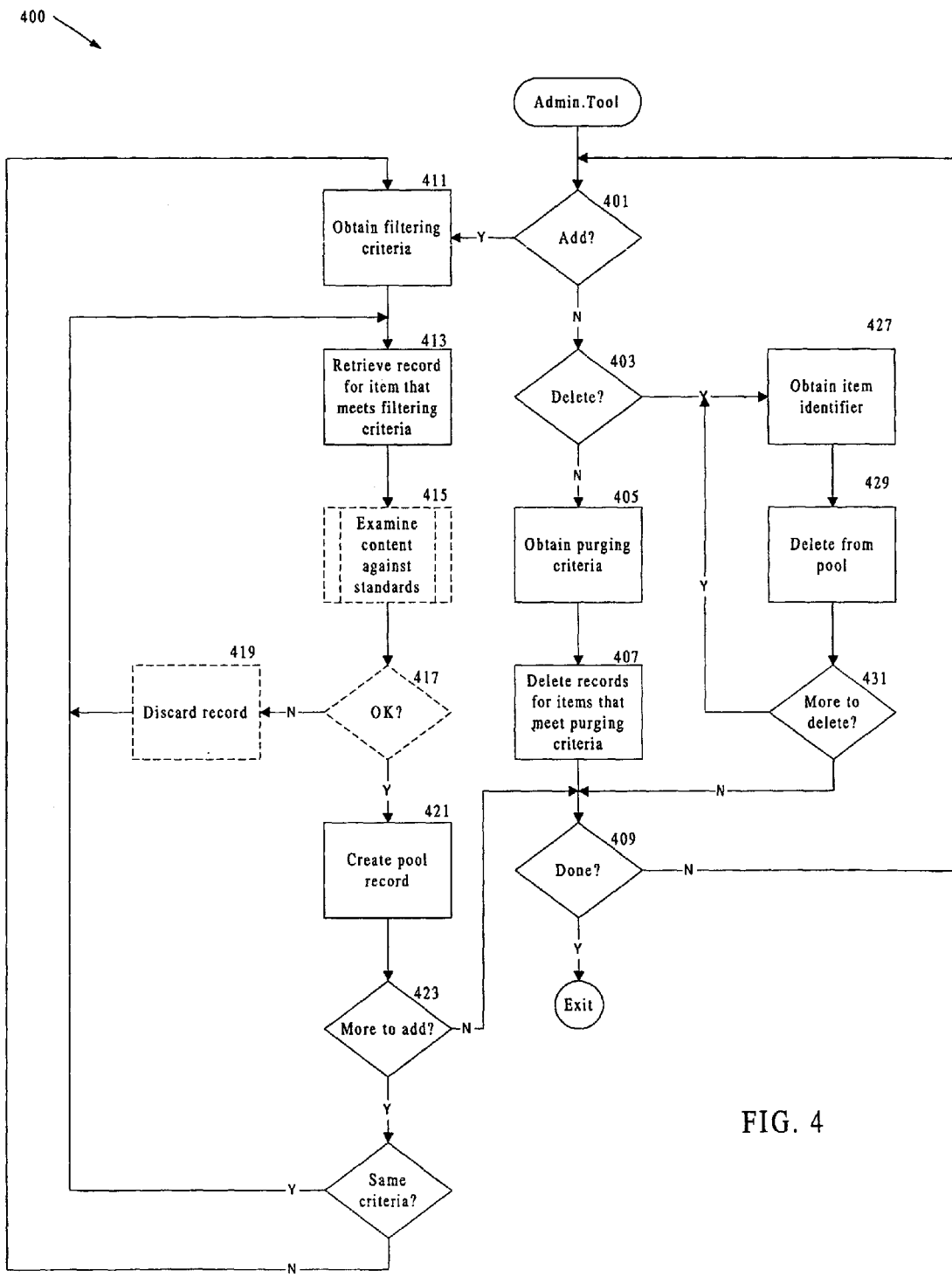
FIG. 4 is a flowchart of a gallery administration tool method to be performed by a computer according to an embodiment of the invention.

Turning now to FIG. 4, one embodiment of a gallery administration tool method 400 is described. The administration tool method 400 allows a user to add (block 401) or delete (block 403) individual image records, or purge an entire group of records from the gallery pool. When the user has completed all desired work on the pool (block 409), the method 400 exits.

If the user wishes to add an image record to the pool, he/she inputs filtering criteria (block 411), which is used to retrieve a matching record from the Gallery (block 413). The appropriate information from the Gallery record is used to create a corresponding record in the image pool (block 421). As many additional matching records can be added by user as desired (block 423) or new filtering criteria can be input (block 425).

The blocks in phantom in FIG. 4 illustrates an embodiment of the gallery administration tool that screens the selected image (block 415) to prevent, for example, an image with an offensive title from being displayed. Any image that fails the screening (block 417) is discarded (block 419) and another image selected (block 413). The screening at block 415 can be automatic based on some pre-determined standards or can be performed manually by the user.

When the user wants to delete individual images from the pool, an identifier for the image record (e.g. the identifier for the item represented by the image) is obtained from the user (block 427). The corresponding image is then deleted from the pool (block 429). If there are more images to delete (block 431), the user is given the opportunity to input another image record identifier.

The pool may need to be purged of images periodically, such as when the items represented by the images are not longer available on the web site. The user inputs purging criteria (block 405) and administration tool method 400 identifies and deletes the matching records (block 407).

One of skill in the art will immediately appreciate that while the administration tool has been described as an interactive program, the method 400 is equally applicable to being executed as a batch program driven by a set of parameters previously input by a user.

The particular methods performed by computer implementing an embodiment of the gallery widget and gallery administration tool have been described. The method performed for the gallery widget has been shown by reference to flowcharts in FIGS. 3A-B including all the acts from 301 until 323. The method performed for the gallery administration tool has been shown by reference to a flowchart in FIG. 4 including all the acts from 401 until 431.

Operating Environment

Figure 5:
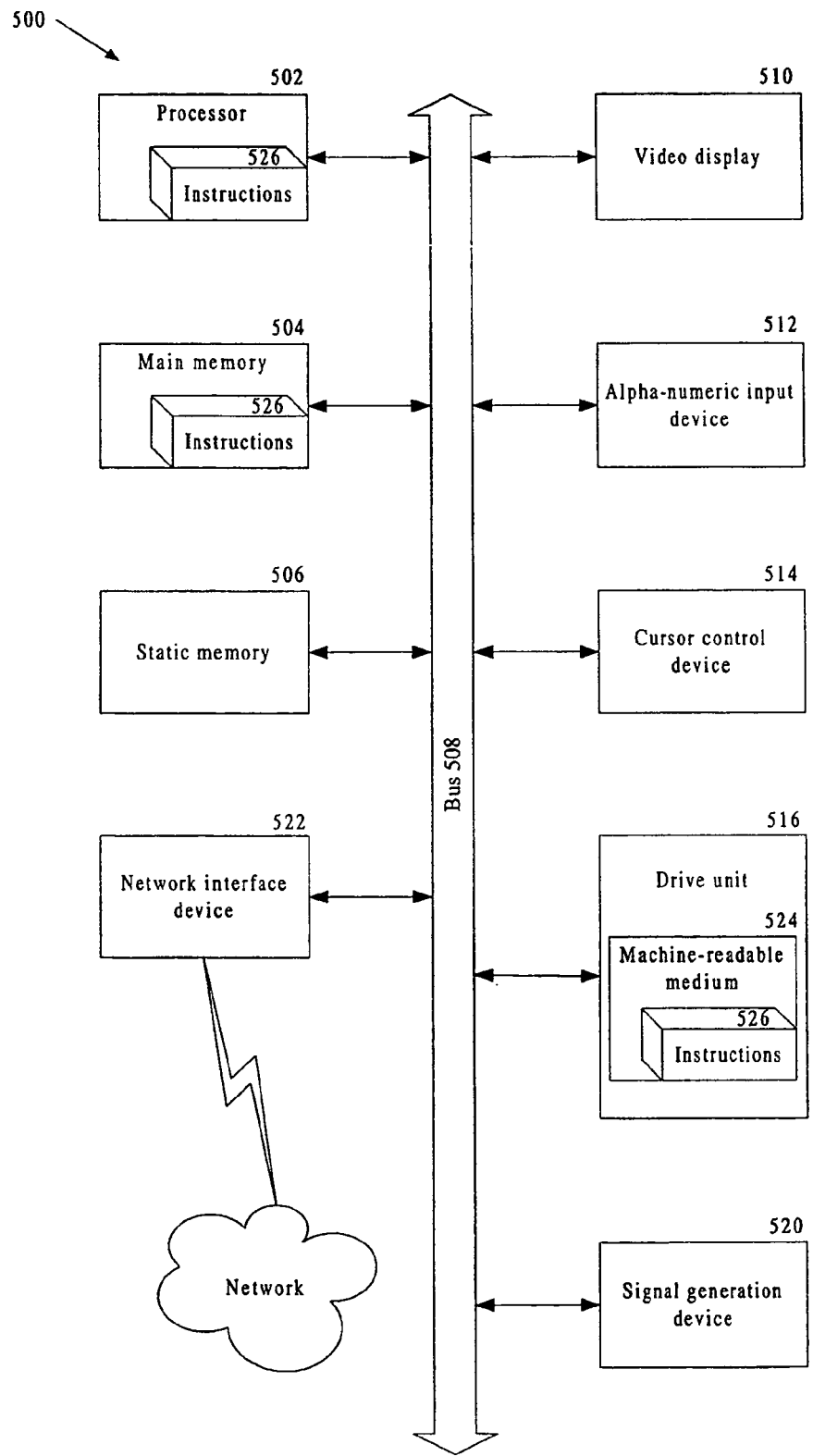
FIG. 5 is a diagram of one embodiment of a hardware and software operating environment suitable for practicing the present invention.

The following description of FIG. 5 is intended to provide an overview of computer hardware and other operating components suitable for implementing the invention, but is not intended to limit the applicable environments. FIG. 5 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

FIG. 5 shows one example of a conventional computer system that can be used as client or server machines. The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alpha-numeric input device 512 (e.g. a keyboard), a cursor control device 514 (e.g. a mouse), a disk drive unit 516, a signal generation device 520 (e.g. a speaker) and a network interface device 522, such as a modem.

The disk drive unit 516 represents non-volatile storage such as a magnetic hard disk, an optical disk, or another form of storage for large amounts of data, and includes a machine-readable medium 524 on which is stored a set of instructions (i.e., software) 526 embodying any one, or all, of the methodologies described above. The software 526 is also shown to reside, completely or at least partially, within the main memory 504 and/or within the processor 502 such as when it is written, often by a direct memory access process, into the main memory 504 during execution of the software by the processor 502. One of skill in the art will immediately recognize that the term "machine-readable medium" includes any type of storage device capable of storing or encoding a sequence of instructions for execution by the processor 502 that causes the machine to perform any one of the methodologies of the present invention. The term "machine-readable medium" (or "computer-readable") shall accordingly be taken to include, but not be limited to, solid-state memories, optical and magnetic disks, and carrier wave signals that encode data signals such as when the software 526 is transmitted or received via the network interface device 522 from/to external systems.

It will be appreciated that the modem or network interface device 522 can be considered to be part of the computer system 500. This interface device 522 can be an analog modem, ISDN modem, cable modem, token ring interface, satellite transmission interface (e.g. "Direct PC"), or other interfaces for coupling a computer system to other computer systems. The computer system 500 and the external systems can be connected in a local area network (LAN) configuration or in a wide-area network WAN configuration (generically represented as network 523). The LAN and WAN can be either public or private networks. One of the most widely used public WANs is the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web. The physical connections of the Internet and the protocols and communication procedures of the Internet are well known to those of skill in the art.

It will be appreciated that the computer system 500 is one example of many possible computer systems which have different architectures. For example, personal computers based on an Intel microprocessor often have multiple buses, one of which can be considered to be a peripheral bus. Network computers are another type of computer system that can be used with the present invention. Network computers do not usually include a hard disk or other mass storage, and the executable programs are loaded from a network connection into the memory 504 for execution by the processor 502. A Web TV system, which is known in the art, is also considered to be a computer system according to the present invention, but it may lack some of the features shown in FIG. 5, such as certain input or output devices. A typical computer system will usually include at least a processor, memory, and a bus coupling the memory to the processor.

It will also be appreciated that the computer system 500 is controlled by operating system software which includes a file management system, such as a disk operating system, which is part of the operating system software. One example of an operating system software with its associated file management system software is the operating system known as Windows '95® from Microsoft Corporation of Redmond, Wash., and its associated file management system. The file management system is typically stored in the non-volatile storage 516 and causes the processor 502 to execute the various acts required by the operating system to input and output data and to store data in memory, including storing files on the non-volatile storage 516.

Conclusion

A gallery widget that provides for the automatic selection and integration of images on markup language documents, such as web pages, has been described. In one aspect, the gallery widget selects the images from a gallery containing all the available images. In another aspect, a supporting gallery administration tool creates a pool of images from those in the gallery and the gallery widget selects the images for the web pages from the pool. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, one of skill in the art will immediately recognize that the invention is not limited to use with an auction web site as described herein, but is suitable for use on with any web-based business that requires a frequent rotation of images on its web site pages. Furthermore, although the invention has been described in conjunction with its use on the World Wide Web, it will be appreciated that the invention is equally applicable in any environment in which images are presented to a user in documents written in a markup language, and that the terminology used in this application is meant to include all environments that incorporate a markup language. Therefore, it is manifestly intended that this invention be limited only by the following claims and equivalents thereof.

What is claimed is:

1. A method to select images for a markup language document, the method comprising:
   encoding an instruction in the markup language document, the instruction to be executed by one or more processors to select an image for insertion into the markup language document;
   generating a pre-determined number N of random numbers;
   selecting a pre-determined umber of N images from a group of images using the N random numbers to select the N images from the group of images, the pre-determined number of N images being specified in the instruction;
   placing the pre-determined number of images in the markup language document at one or more locations defined in the instruction, the pre-determined number of N images to be displayed on one or more web pages, and
   selecting the group of images for a pool of images from a gallery containing images available for display, the selecting of the group of images being performed using an administration tool,
   the selecting the group of images for the pool of images includes:
      obtaining filtering criteria;
      identifying an image from the gallery based on the filtering criteria; and
      adding the identified image to the pool of images.

2. The method of claim 1, further comprising selecting the group of images from a gallery containing images available for display.

3. The method of claim 1 further comprising: examining information associated with the identified image against a set of standards; and based on a determination that the information does not meet at least a portion &the set of standards, discarding the identified image.

4. The method of claim 1 further comprising deleting a selected one of the identified images from the pool of images.

5. The method of claim 1, wherein the markup language document is a web page and the instruction is a tag in a proprietary format.

6. The method of claim 5, wherein a utility program is executed, using at least one of the one or more processors, when the tag in the proprietary format is processed during a compile of the web page.

7. The method of claim 5, wherein the proprietary format comprises a widget identifier, the pre-determined number of N images, and one or more display parameters.

8. The method of claim 7, wherein the one or more display parameters comprise a size parameter and a location parameter.

9. The method of claim 5, wherein the proprietary format comprises a widget identifier, a category identifier, the pre-determined number of N images, and one or more display parameters.

10. The method of claim 1 further comprising: validating the pre-determined number of N images against validation criteria; and based on a determination that an image fails the validation criteria, substituting a different image for the failed image.

11. A system for selecting images for a markup language document, the system comprising:
   means for encoding an instruction in the markup language document, the instruction to be executed by one or more processors to select an image for insertion into the markup language document;
   means for generating a pre-determined number of N random numbers;
   means for selecting a pre-determined number of N images from a group of images using the N random numbers to select the N images from the group of images, the pre-determined number being specified in the instruction;
   means for placing the pre-determined number of N images in the markup language document at locations defined in the instruction the pre-determined number of N images to be displayed on one or more web pages, and
   an administration tool to select the group of images for a pool of images from a gallery containing images available for display, the administration tool includes:
   a means for obtaining filtering criteria;
   a means for identifying an image from the gallery based on the filtering criteria; and
   a means for adding the identified image to the pool of images.

12. The system of claim 11 further comprising a means for examining information associated with the identified image against a set of standards, and based on a determination that the information does not meet at least a portion of the set of standards, discarding the identified image.

13. The system of claim 11 further comprising a means for validating the pre-determined number of N images against validation criteria, and based on a determination that an image fails the validation criteria, substituting a different image for the failed image.

14. A non-transitory machine-readable storage medium storing a set of instructions that, when executed by one or more processors, causes the one or more processors to perform a method to select images for a markup language document, the method comprising:
   encoding an instruction in the markup language document, the instruction to be executed by one or more processors to select an image for insertion into the markup language document;
   generating a pre-determined number N of random numbers;
   selecting a pre-determined umber of N images from a group of images using the N random numbers to select the N images from the group of images, the pre-determined number of N images being specified in the instruction;
   placing the pre-determined number of images in the markup language document at one or more locations defined in the instruction, the pre-determined number of N images to be displayed on one or more web pages, and
   selecting the group of images for a pool of images from a gallery containing images available for display, the selecting of the group of images being performed using an administration tool,
   the selecting the group of images for the pool of images includes:
      obtaining filtering criteria;
      identifying an image from the gallery based on the filtering criteria; and
      adding the identified image to the pool of images.

15. The non-transitory machine-readable storage medium of claim 14, wherein the method further comprises:
   examining information associated with the identified N images against a set of standards; and based on a determination that the information does not meet at least a portion of the set of standards, discarding at least one of the identified N images.

16. The non-transitory machine-readable storage medium of claim 14, wherein the method further comprises deleting a selected one of the N identified images from the pool of images.

* * * * *

UNITED STATES PATENT AND TRADEMARK OFFICE
CERTIFICATE OF CORRECTION

PATENT NO. : 8,335,983 B2
APPLICATION NO. : 12/620450
DATED : December 18, 2012
INVENTOR(S) : Pearson et al.

It is certified that error appears in the above-identified patent and that said Letters Patent is hereby corrected as shown below:

On page 3, in column 1, under "Other Publications", line 23-24, after ""U.S. Appl. No. 09/589,585, Restriction Requirement mailed Nov. 25, 2003", 5 pgs.", insert --"U.S. Appl. No. 09/589,585, Supplemental Notice of Allowability mailed Nov. 20, 2009", 11 pgs--, therefor On page 3, in column 2, under "Other Publications", line 13, after "12/416,076", insert --,--, therefor On page 3, in column 2, under "Other Publications", line 27, delete "Examiner" and insert --Examiner's--, therefor On page 3, in column 2, under "Other Publications", line 34, after "Report", insert --mailed--, therefor On page 3, in column 2, under "Other Publications", line 44, delete "vol. 3,," and insert --vol. 3,--, therefor On page 3, in column 2, under "Other Publications", line 66, delete "P J," and insert --P.J.,--, therefor On page 4, in column 1, under "Other Publications", line 1, delete "V. N," and insert --V. N.,--, therefor On page 4, in column 1, under "Other Publications", line 15-16, after ""U.S. Appl. No. 12/347,929, Response filed Oct. 22, 2010 Final Office Action mailed Sep. 20, 2010", 12 pgs.", insert --"Japanese Application Serial No. 2002-502756, Office Action Response Sep. 10, 2010", 13 pgs.--, therefor On page 4, in column 2, under "Other Publications", line 2, delete "1 pgs." and insert --1 pg.--, therefor On page 4, in column 2, under "Other Publications", line 23, delete "Mailed" and insert --mailed--, therefor Signed and Sealed this
Twenty-sixth Day of March, 2013

Teresa Stanek Rea
*Acting Director of the United States Patent and Trademark Office*

CERTIFICATE OF CORRECTION (continued)
U.S. Pat. No. 8,335,983 B2

In the drawings, Sheet 5 of 6, Fig. 4, above "Decision box(Same criteria?)" insert --425--, therefor On sheet 6 of 6, Fig. 5, above "Network", insert --523--, therefor In column 2, line 23, delete "3a" and insert --3A--, therefor In column 2, line 37, after "and", delete "in", therefor In column 2, line 38, after "illustration", insert --of--, therefor In column 3, line 22, delete "index" and insert --indexer--, therefor In column 3, line 36, delete "FIG. 5" and insert --FIG. 2--, therefor In column 4, line 27, delete "211" and insert --213--, therefor In column 4, line 28, delete "203" and insert --215--, therefor In column 4, line 37, delete "203" and insert --215--, therefor In column 4, line 67, after "media)", insert --.--, therefor In column 5, line 13, after "or", delete "a", therefor In column 6, line 5, delete "not" and insert --no--, therefor In column 6, line 45, delete "e.g." and insert --e.g.,--, therefor In column 6, line 45, delete "e.g." and insert --e.g.,--, therefor In column 6, line 46, delete "e.g." and insert --e.g.,--, therefor In column 8, line 22, in Claim 1, delete "umber" and insert --number--, therefor In column 8, line 47, in Claim 3, delete "&the" and insert --of the--, therefor In column 10, line 10, in Claim 14, delete "umber" and insert --number--, therefor